United States Patent
Hebert et al.

(10) Patent No.: US 10,336,150 B1
(45) Date of Patent: Jul. 2, 2019

(54) DETERMINING PAYLOAD PROPERTIES USING ACTUATOR PARAMETER DATA

(71) Applicant: Amazon Technologies, Inc., Seattle, WA (US)

(72) Inventors: Gabriel Hebert, Waltham, MA (US); Erica Aduh, Cambridge, MA (US); Peter Thomas Colantonio, North Andover, MA (US); Parris S. Wellman, Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 125 days.

(21) Appl. No.: 15/368,418

(22) Filed: Dec. 2, 2016

(51) Int. Cl.
*B60P 1/00* (2006.01)
*B60P 5/00* (2006.01)
*G05B 13/00* (2006.01)
*B60G 17/019* (2006.01)
*G05B 19/042* (2006.01)

(52) U.S. Cl.
CPC ... *B60G 17/01908* (2013.01); *G05B 19/0426* (2013.01); *B60G 2400/63* (2013.01); *G05B 2219/2641* (2013.01)

(58) Field of Classification Search
CPC ............ B60G 2400/60; B60G 2400/63; G05B 2219/2641
See application file for complete search history.

(56) References Cited

U.S. PATENT DOCUMENTS

| | | | |
|---|---|---|---|
| 7,962,256 B2 * | 6/2011 | Stevens | G05D 1/0891 180/167 |
| 8,280,547 B2 | 10/2012 | D'Andrea et al. | |
| 9,087,314 B2 | 7/2015 | Hoffman et al. | |
| 9,358,975 B1 * | 6/2016 | Watts | B60W 30/04 |
| 2016/0347544 A1 * | 12/2016 | Kvifte | E06C 7/12 |
| 2017/0260028 A1 * | 9/2017 | Verheyen | B66C 13/16 |

* cited by examiner

*Primary Examiner* — Anshul Sood
(74) *Attorney, Agent, or Firm* — Kilpatrick Townsend & Stockton LLP

(57) ABSTRACT

Payload properties may be determined utilizing actuator parameter data. A mobile drive unit may transport a payload around a workspace in accordance with one or more safety. To comply with safety policies, a motion controller of the mobile drive unit may limit acceleration and deceleration to safe maximums for given payload characteristics such as payload mass and payload center of gravity. The motion controller may utilize actuators to cause various motions of the mobile drive unit, including motion across a surface, vertical movements of the payload and motion rotating the payload. To ameliorate worst case assumptions about payload characteristics, in accordance with at least one embodiment of the invention, a payload characterization module may obtain information about payload characteristics based on measurements of operational parameters of the actuators. Utilizing motor current data provides a relatively inexpensive mechanism for obtaining such information compared to special purpose sensors, enabling widespread adoption.

16 Claims, 15 Drawing Sheets

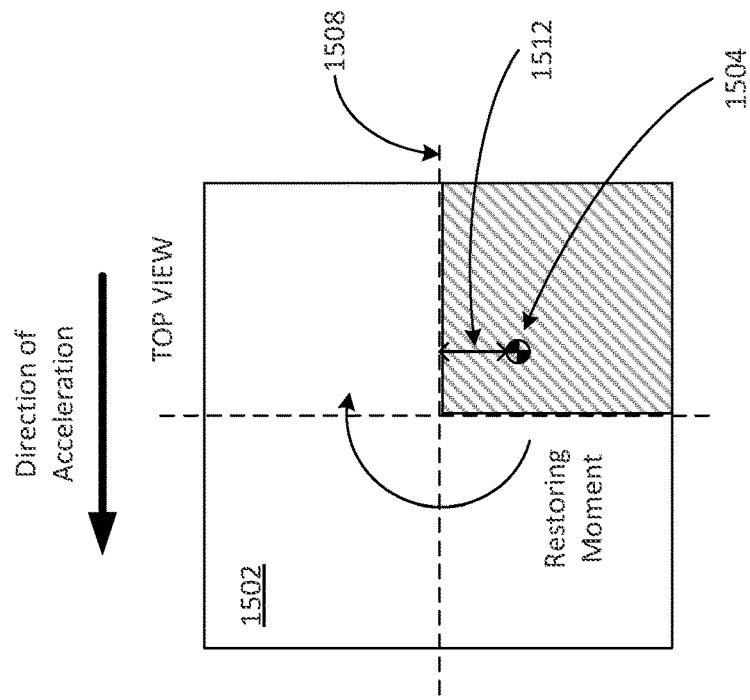
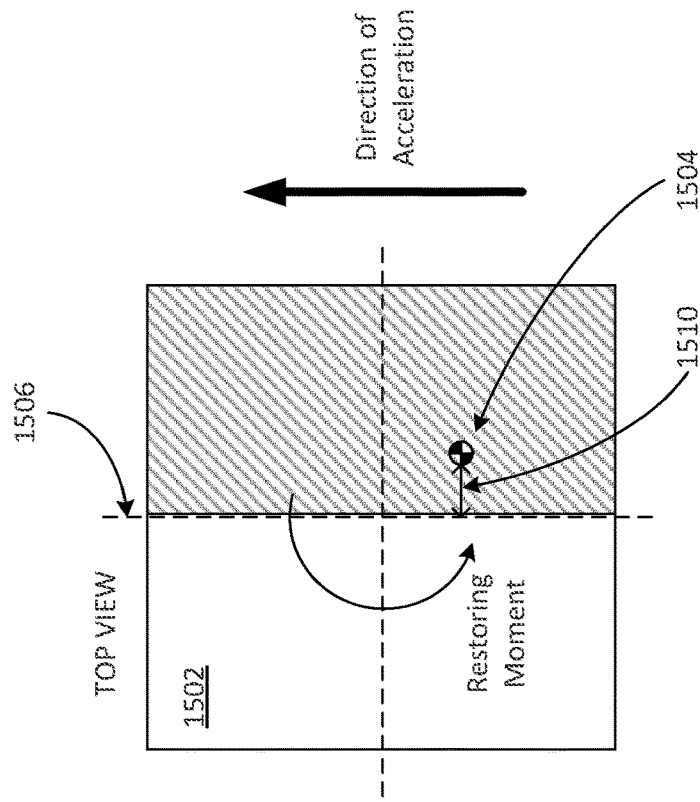
FIG. 15B
FIG. 15A

DETERMINING PAYLOAD PROPERTIES USING ACTUATOR PARAMETER DATA

BACKGROUND

It has become common for autonomous machines to move through public and restricted spaces to accomplish tasks. Since these spaces are often shared with people, the safety of these movements is paramount. However, safety concerns can often result in slow moving machines which is undesirable for several reasons including prolonged occupation of shared space and lengthened task accomplishment times. For example, safety standards can require that motion controllers of mobile machines assume worst case values for various characteristics of the mobile machines, resulting in excessively slow motion.

The problem can be exacerbated in situations where characteristics of the mobile machines change regularly, even frequently. For example, consider the case of a mobile machine that transports a payload. Even when the characteristics of the mobile machine are relatively static, the characteristics of the payload (e.g., the characteristics related to Newtonian mechanics) can change regularly. In some situations, the payload may be an item holder, with a variety of item types being added to and removed from the payload at frequent intervals. The requirement to make worst case assumptions for mobile machines with changing characteristics means that conventional motion control systems and methods can become excessively slow, prohibitively costly, inefficient (e.g., with respect to time), and/or even ineffective for some tasks.

BRIEF DESCRIPTION OF THE DRAWINGS

Various embodiments in accordance with the present disclosure will be described with reference to the drawings, in which:

FIG. 15A and FIG. 15B are schematic diagrams illustrating example restoring moments utilizable to determine payload center of gravity location in accordance with at least one embodiment;

DETAILED DESCRIPTION

Figure 1:
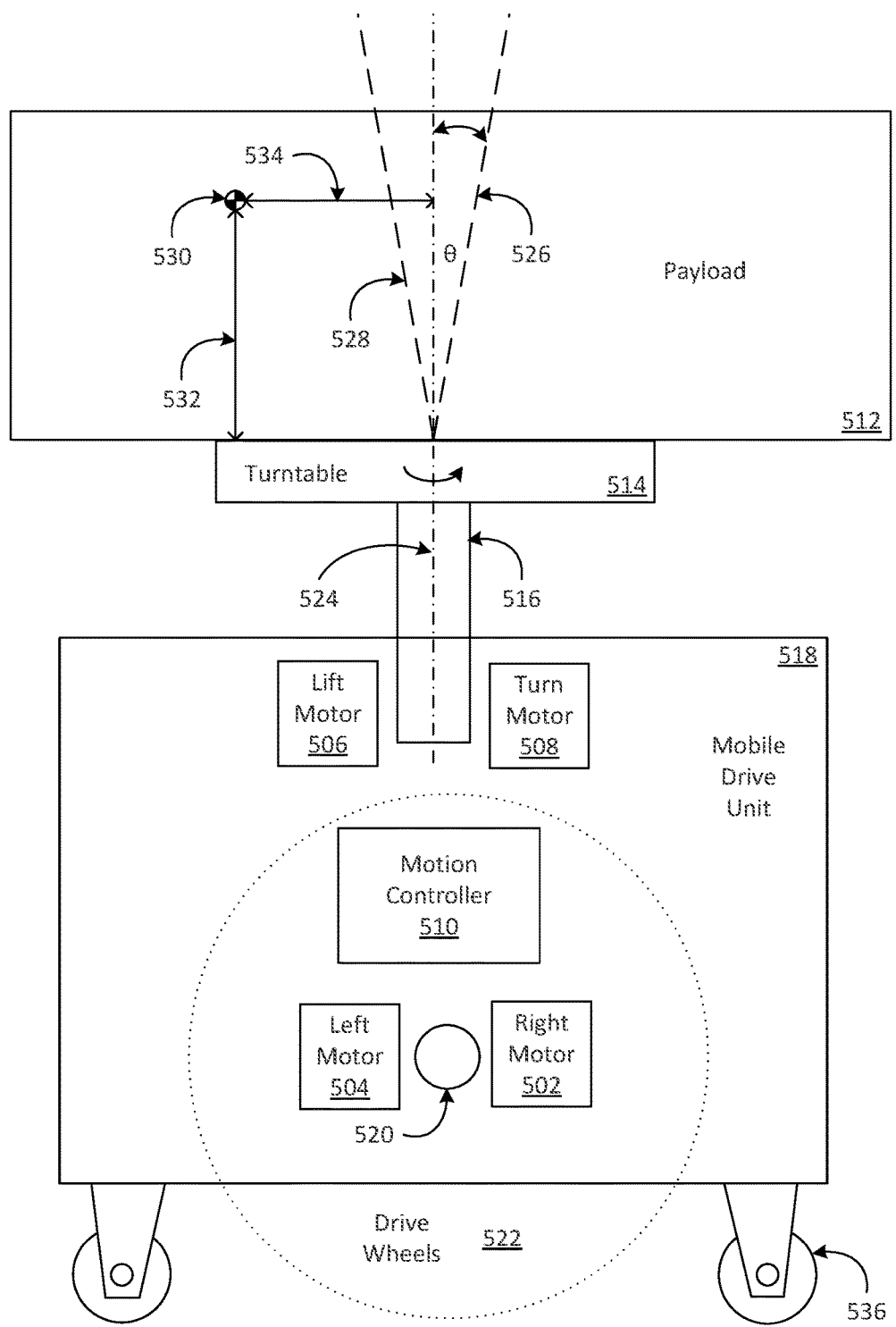
FIG. 1 is a schematic diagram depicting aspects of an example mobile drive unit transporting a payload in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In accordance with at least one embodiment, payload properties may be determined utilizing actuator parameter data. A mobile drive unit may transport a payload (e.g., an item holder storing multiple items of multiple different types) around a workspace (e.g., an item storage location containing multiple item holders) in accordance with one or more safety policies (e.g., specifying maximum allowed risk of unintentional payload decoupling). To comply with safety policies, a motion controller of the mobile drive unit may limit acceleration and deceleration to safe maximums for given payload characteristics such as payload mass and payload center of gravity. The motion controller may utilize actuators (e.g., electric motors) to cause various motions of the mobile drive unit, including motion across a surface (e.g., the workspace floor), motion lifting and/or lowering (vertically moving) the payload and motion rotating the payload. To ameliorate worst case assumptions about payload characteristics, in accordance with at least one embodiment, a payload characterization module (e.g., incorporated into the mobile drive unit) may obtain information about payload characteristics based on measurements of operational parameters (e.g., electric currents) of the actuators ("actuator parameter data" such as "motor current data"). In accordance with at least one embodiment, utilizing actuator parameter data provides a relatively inexpensive mechanism for obtaining such information compared to special purpose sensors, enabling widespread adoption. For clarity, electric motors are used throughout this description as examples of actuators, and electric current as an actuator operational parameter. However, as will be apparent to one of skill in the art, any suitable actuator and actuator operational parameter may be substituted, such as hydraulic, pneumatic, thermal, magnetic and mechanical actuators, as well as pressure, temperature, magnetic field strength, mechanical strain or displacement, and/or transduced signal representations thereof.

Techniques described herein include determining payload mass based on measured current in a payload lifting motor of the mobile drive unit, and constraining worst case assumptions about the center of gravity of the payload mass based on measured currents in one or more motors of the mobile drive unit including one or more wheel motors (e.g., left and right wheel motors), and a turntable motor (e.g., capable of rotating a turntable coupled with the payload thereby causing the payload to rotate). For example, the center of gravity of the payload has a real and finite location in three dimensional space. A height of the center of gravity (e.g., above a surface of the mobile drive unit) may be determined based on a frequency of oscillations in motor current during a motion and/or after a mobile drive unit transporting a payload comes to a halt. For example, the payload may be modeled as an inverted pendulum of known mass and stiffness having a natural frequency corresponding to the frequency of the oscillations in motor current. The oscillations may occur as the motion controller of the mobile drive unit compensates for the natural oscillations of the payload that occur during the motion and/or after the mobile drive unit transporting the payload comes to a halt.

The mobile drive unit may dock and undock with various payloads. The mobile drive unit may include a docking head capable of rotating about an axis, for example, to rotate a docked payload, as well as a corresponding payload rotation or turntable motor. If the center of gravity of a docked payload is not located on the axis of rotation, the docking head may experience a torque due to inertial effects during linear motion of the mobile drive. If so, the motion controller may attempt to provide restoring torque to prevent unwanted payload rotation and/or to maintain the payload in an initial and/or desired orientation. In accordance with at least one embodiment, information about the location of the center of gravity in a plane perpendicular to the axis may be obtained based on measuring current flow in the payload rotation motor. For movement in a given direction, the sign of the current flow can locate the center of gravity in a particular half of plane and/or a corresponding portion of a payload cross-section. Even this information ameliorates the worst case assumptions imposed for safety. Additional movements in different directions further constrain the location of the center of gravity in the plane, e.g., to intersections of half-planes and/or corresponding portions of payload cross-sections. Two orthogonal movements can identify a quadrant containing the center of gravity using just current sign data. In accordance with at least one embodiment, a distance of the center of gravity from the axis of rotation may be determined based on the magnitude of the current flow in the payload rotation motor.

Conversion parameters for converting actuator parameter data to payload characteristics may be obtained by transporting calibration payloads with known (e.g., predetermined) mass, center of gravity height, center of gravity offset from the axis of rotation, and stiffness. Where multiple mobile drive units (and possibly multiple calibration payloads) are available, calibration accuracy and/or precision may be improved by collectively determining conversion parameters (e.g., utilizing statistical techniques). Alternatively, or in addition, pertinent mobile drive unit and/or payload characteristics may be modeled (e.g., using a hidden Markov model) and parameter estimates continuously updated based on selected measurements (e.g., with Bayesian techniques) as mobile drive units transport payloads as part of their ordinarily assigned activities.

Once payload characteristics are available, instructions may be determined for stowing agents to optimize center of gravity location, for example, the instructions may specify stow locations that are preferred or prohibited for storage of additional items. For example, an optimal center of gravity may correspond to a lower center of gravity and more closely located to the axis of rotation. An optimal center of gravity may enable higher maximum safe mobile drive unit accelerations and decelerations, in turn enabling faster, more efficient payload transport and/or task performance. When the center of gravity is offset from the axis in a particular direction, routing for the mobile drive unit may take the offset into account to optimize travel time. A docking offset between the mobile drive unit and the payload (e.g., misalignment of the axis of rotation with a geometric center of the payload) may also be taken into account and/or optimized (e.g., minimized) during docking.

Payload characteristics may also be utilized for other purposes. For example, where the payload is made up of multiple items, better characterization of payload mass (e.g., better accuracy and/or precision) may be utilized to better characterize the mass of the individual items making up the payload. If item mass can be adequately determined by the mobile drive unit, e.g., at the time the item is added to or removed from the payload, a separate item weighing operation may be omitted, speeding item stowing and/or picking. For example, the current payload may result from a sequence of payload modification operations (e.g., item stowing or item picking operations where an item is added to or removed from the payload by a stowing or picking agent, thereby changing the mass of the payload), and an item's mass may be determined based at least in part on a change in payload mass between two payload modification operations in the sequence. For like items, mass properties may be refined and/or learned over several payload modification operations. Precision and accuracy may be determined such that separate weighing is not required. As another example, where the payload is made up of items of similar mass, the mass determined from actuator parameter data may be utilized to count the number of items in the payload. As yet another example, unexpected (e.g., sudden) changes in payload characteristics may indicate accidents, changes in structural integrity including structural failures, and/or a need for service or other special handling such as human inspection. As still another example, better knowledge of payload sway dynamics can be utilized to reduce grid spacing between payloads arranged in a warehouse and/or storage location.

FIG. 1 depicts aspects of an example mobile drive unit transporting a payload 500 in accordance with at least one embodiment. FIG. 1 is schematic and not to scale. Size and shape of various aspects are varied for clarity. In the example 500, a mobile drive unit 518 is removably coupled with a payload 512 utilizing a turntable 514 (also called herein a docking head) coupled with a lift mechanism 516. The mobile drive unit 518 includes left and right drive motors 504, 502 coupled with left and right wheel shafts 520 such that the left and right drive motors 504, 502 are capable of turning left and right drive wheels 522 thereby causing a traveling motion of the mobile drive unit 518. The mobile drive unit 518 may further include one or more stabilization wheels (not necessarily motorized) such as stabilization wheel 536.

The mobile drive unit 518 may further include a lift motor 506 configured to raise and lower turntable 514 with the lift mechanism 516, and a turn motor 508 configured to rotate the turntable 514, and thereby the payload 512 about axis of rotation 524. The payload 512 has center of gravity 530 with height 532 and offset from axis 534. During a motion and/or upon halting, the payload 512 may tend to oscillate from position 526 to position 528 about the axis 524 responsive to stabilization efforts of a motion controller 510. The motion controller 510 may control several motions of the mobile drive unit 518 and/or the payload 512. In particular, the motion controller 510 may control the motions of the mobile drive unit 518 with the electric motors 502, 504, 506,

508 of the mobile drive unit 518. An example motion controller 510 in accordance with at least one embodiment is described below in more detail with reference to FIG. 13.

Figure 2:
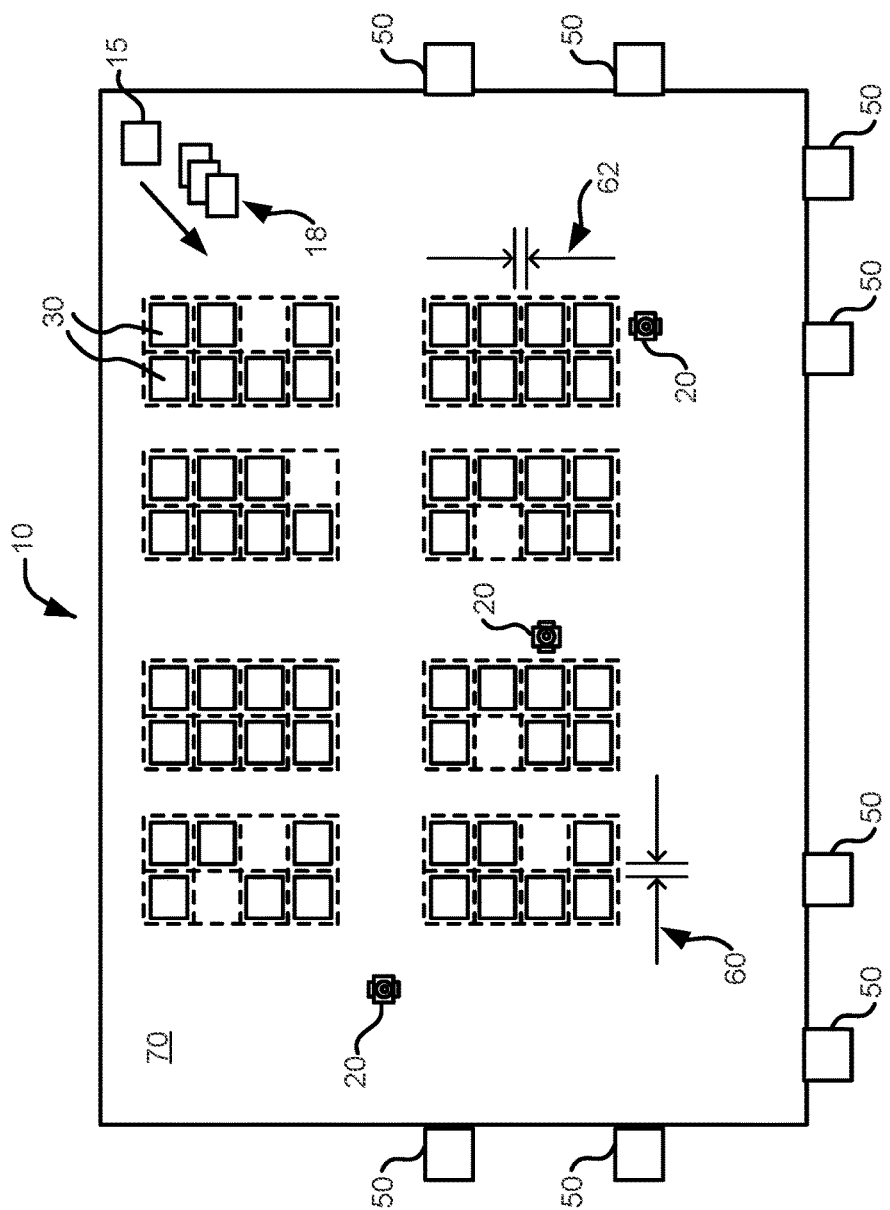
FIG. 2 is a schematic diagram illustrating components of an example inventory system in accordance with at least one embodiment.

FIG. 2 illustrates components of an example inventory system 10 in accordance with at least one embodiment. Inventory system 10 includes a management module 15, one or more mobile drive units 20, one or more inventory holders 30, and one or more inventory stations 50. The mobile drive unit 518 (FIG. 1) is an example of the mobile drive units 20. Mobile drive units 20 transport inventory holders 30 between points within a workspace 70 in response to commands communicated by management module 15. An inventory holder 30 is an example of a payload 512 (FIG. 1). Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, lowering, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in 1i which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

As depicted in FIG. 2, inventory holders 30 may be arranged in the workspace 70 in relation to each other, for example, arranged in one or more packing patterns. Often, a packing density of inventory holders 30 is a workspace 70 configuration parameter to be optimized (e.g., maximized). For example, horizontal spacing 60, 62 (sometimes called grid spacing) between inventory holders 30 may influence packing density, and optimizing the workspace 70 may include optimizing (e.g., minimizing) the horizontal spacing 60, 62. The horizontal spacing 60, 62 may depend on mobile drive unit 20 behavior and/or characteristics. For example, the horizontal spacing 60, 62 may be determined based at least in part on an amount of sway or oscillation of a payload transported by the mobile drive unit 20. In accordance with at least one embodiment, better characterization (e.g., with respect to accuracy and/or precision) of a payload 512 (FIG. 1) mass and/or center of gravity 530 transported by mobile drive units 20 can enable lower safe horizontal spacing 60, 62 and, hence, higher inventory holder 30 packing density.

Figure 3:
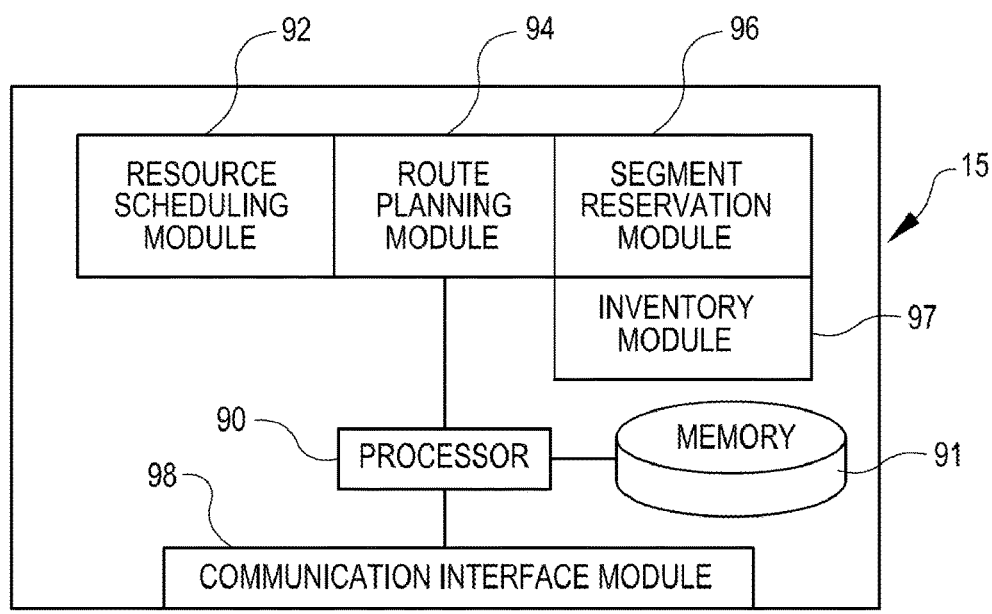
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
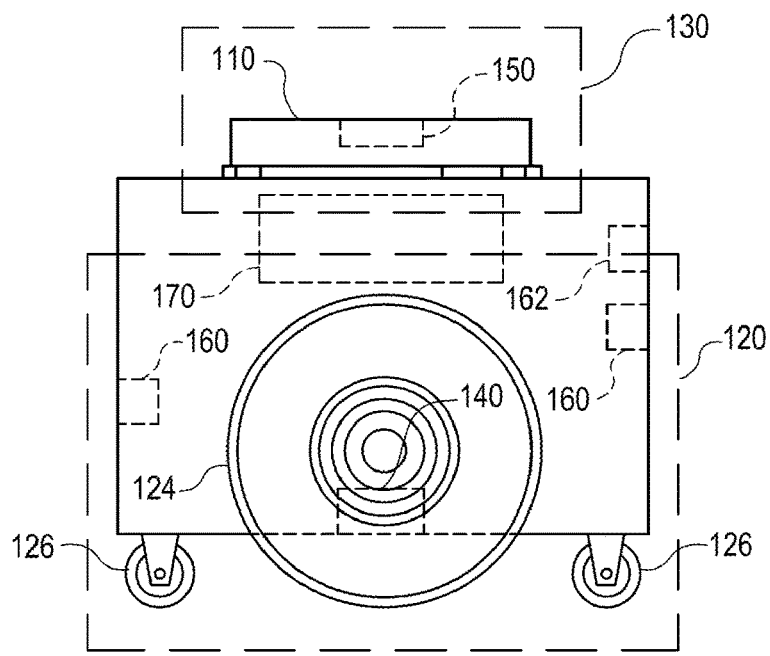
FIGS. 4 and 5 illustrate in greater detail an example mobile drive unit that may be utilized in particular embodiments of the inventory system shown in FIG. 2.
Figure 5:
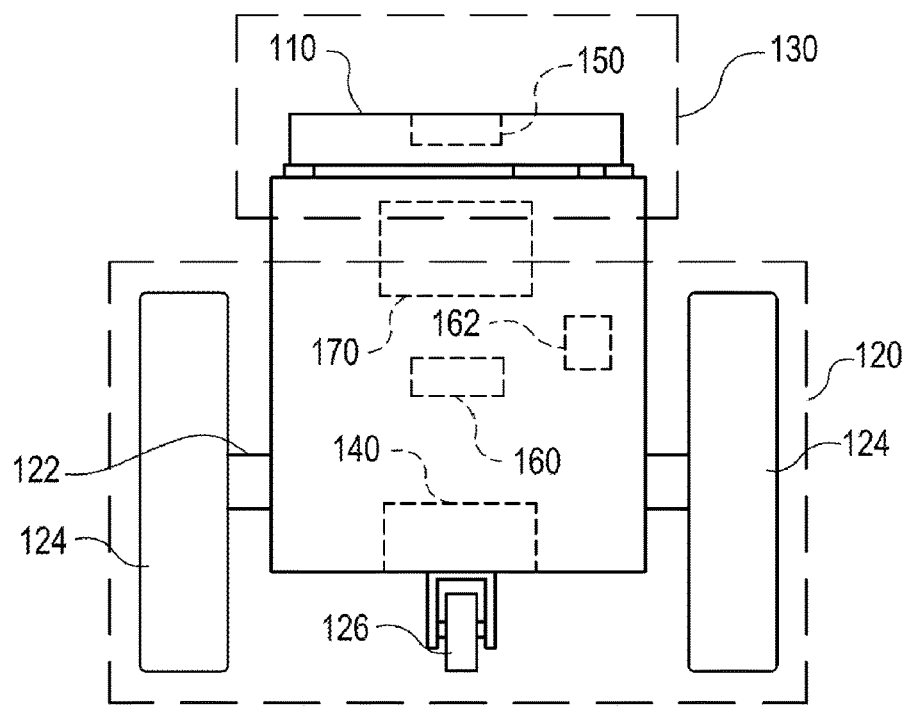

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting and/or lowering inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking.

Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift and/or lower the docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift and/or lower the inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
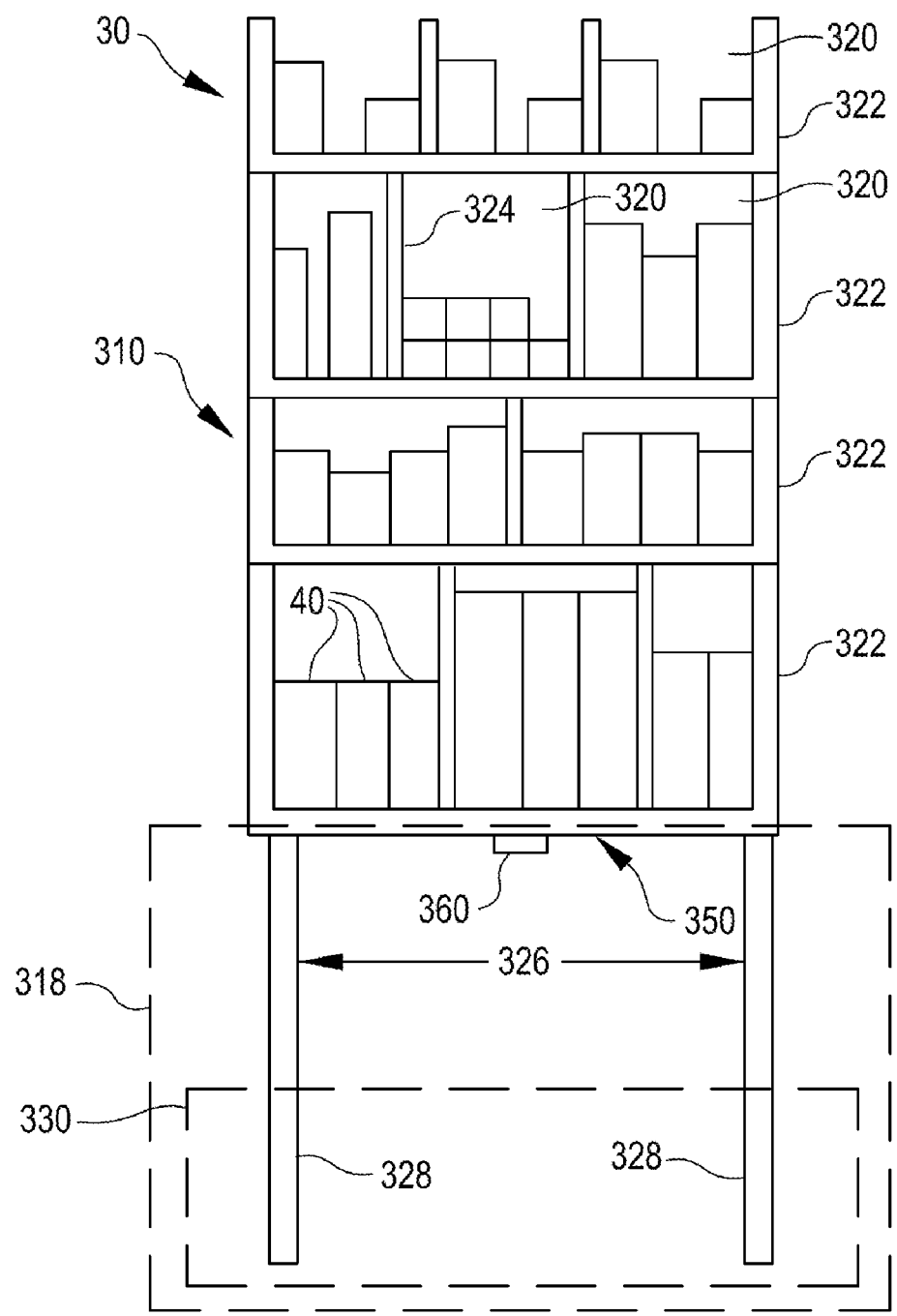
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

FIGS. 7-12 illustrate operation of particular embodiments of mobile drive unit 20 and inventory holder 30 during docking, movement, and undocking.

Figure 7:
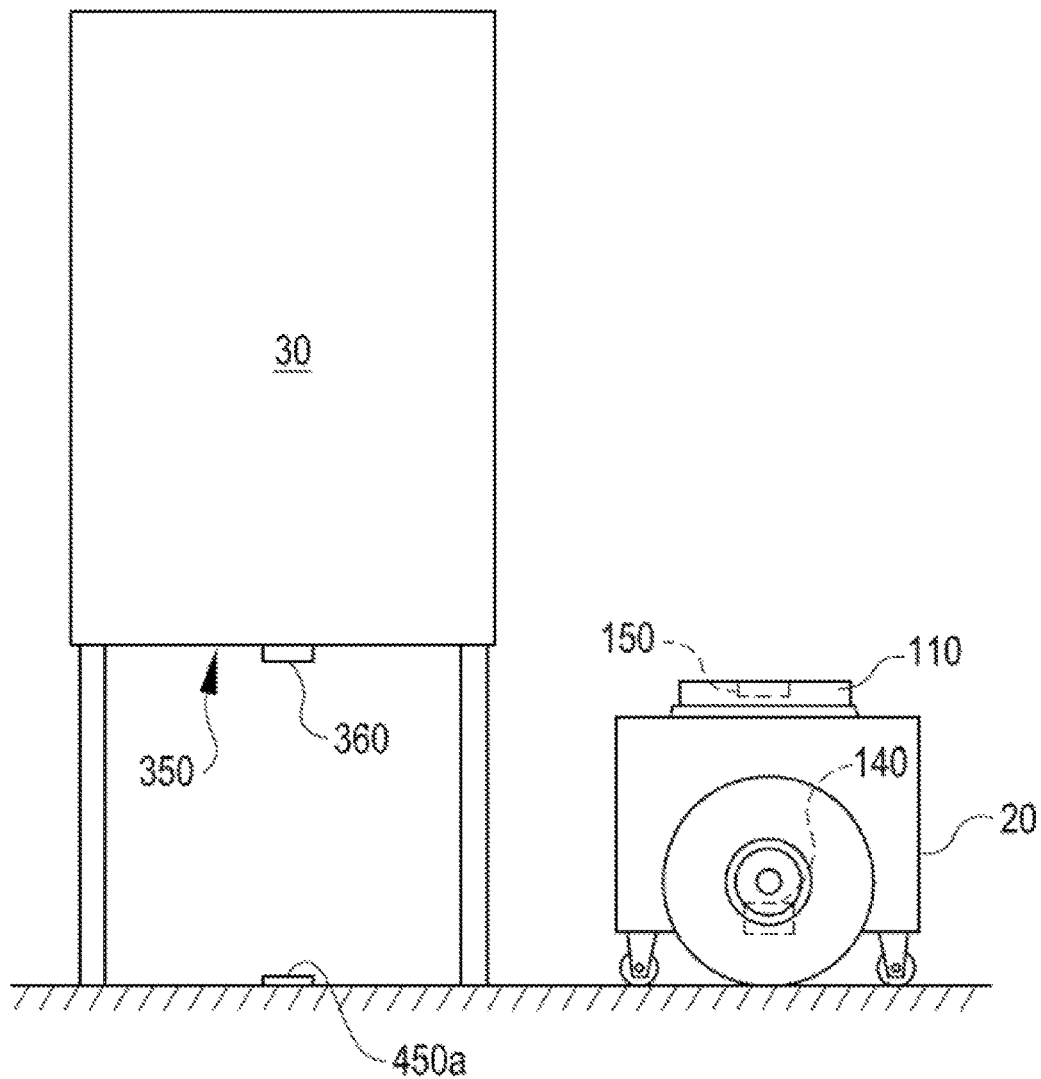
FIGS. 7-12 show operation of various components of the mobile drive unit and the inventory holder during docking, movement and undocking.

FIG. 7 illustrates mobile drive unit 20 and inventory holder 30 prior to docking. As noted above with respect to FIG. 2, mobile drive unit 20 may receive a command that identifies a location for a particular inventory holder 30. Mobile drive unit 20 may then move to the location specified in the command. Additionally, mobile drive unit 20 may utilize position sensor 140 to determine the location of mobile drive unit 20 to assist in navigating to the location of inventory holder 30.

In particular, FIG. 7 shows mobile drive unit 20 and inventory holder 30 as mobile drive unit 20 approaches the storage location identified by the received command. In the illustrated embodiment, the reference point is marked by fiducial mark 450A which comprises a surface operable to reflect light and which, as a result, can be detected by particular embodiments of position sensor 140 when mobile drive unit 20 is positioned over or approximately over fiducial mark 450A. As noted above, the illustrated embodiment of mobile drive unit 20 utilizes optical sensors, including a camera and appropriate image- and/or video processing components, to detect fiducial marks 450.

Figure 8:
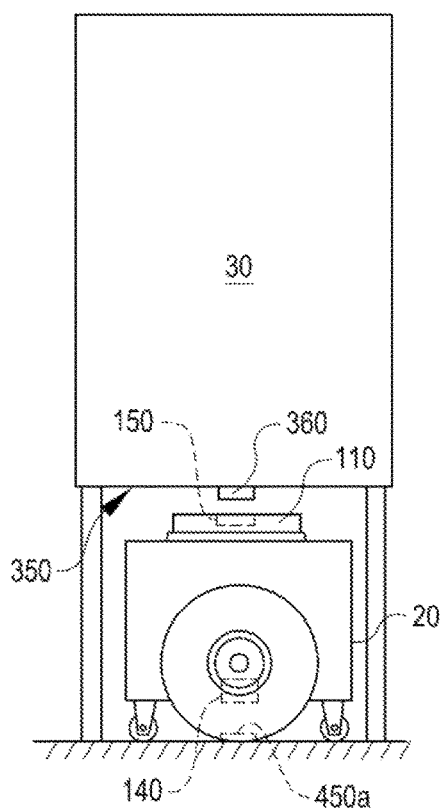

FIG. 8 illustrates mobile drive unit 20 and inventory holder 30 once mobile drive unit 20 reaches fiducial mark 450A. Because, in the illustrated example, fiducial mark 450A marks the location of the reference point to which mobile drive unit 20 is destined, mobile drive unit 20 begins the docking process once mobile drive unit 20 reaches fiducial mark 450A. In the illustrated example, mobile drive unit 20 is configured to dock with inventory holder 30 from a position beneath inventory holder 30 and, as a result, inventory holder 30 is stored so that docking surface 350 is located directly above fiducial mark 450A.

Figure 9:
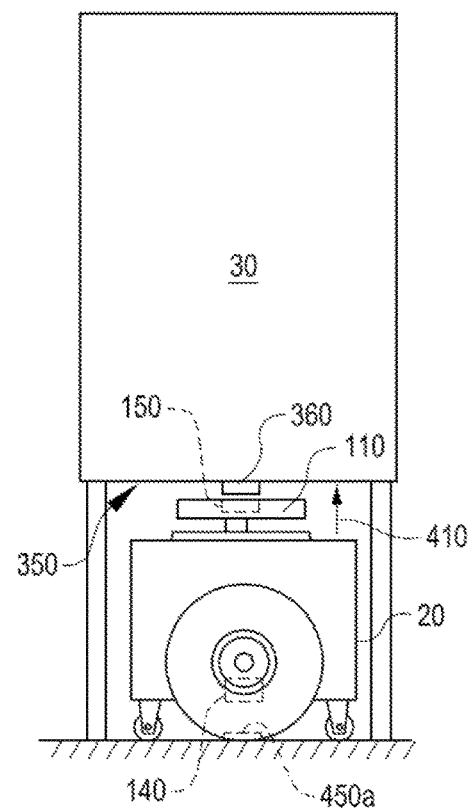

FIG. 9 illustrates operation of mobile drive unit 20 in docking with inventory holder 30. After positioning itself over fiducial mark 450A, mobile drive unit 20 begins the docking process. In the illustrated example, the docking process includes mobile drive unit 20 raising docking head 110 towards docking surface 350, as indicated by arrow 410. Additionally, in the illustrated example, mobile drive unit 20 and inventory holder 30 are configured so that mobile drive unit 20 lifts inventory holder 30 off the ground when mobile drive unit 20 docks with inventory holder 30 and, as a result, mobile drive unit 20 supports the weight of inventory holder 30 while mobile drive unit 20 is docked to inventory holder 30.

Figure 10:
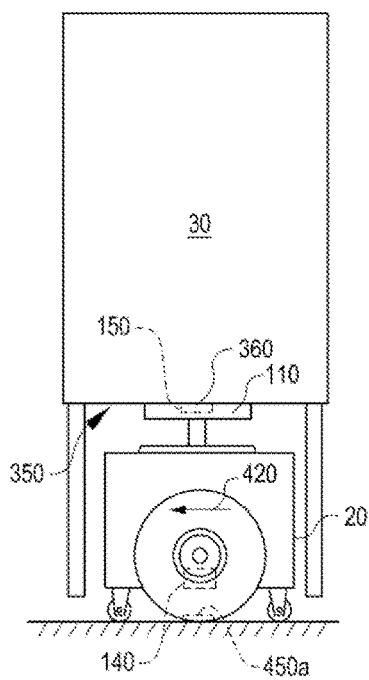

FIG. 10 illustrates operation of mobile drive unit 20 after docking with inventory holder 30. Mobile drive unit 20 is capable of inducing translational and/or rotational movement in inventory holder 30 while mobile drive unit 20 is docked with inventory holder 30. For example, in the illustrated embodiment, inventory holder 30 is supported by mobile drive unit 20 while the two components are docked and mobile drive unit 20 is capable of inducing translational and/or rotational movement in inventory holder 30 by moving or rotating itself or some sub-component of itself, such as docking head 110. As a result, while mobile drive unit 20 and inventory holder 30 are docked mobile drive unit 20 may move inventory holder 30 to a requested destination based on commands received by mobile drive unit 20, as suggested by arrow 420.

Once mobile drive unit 20 and inventory holder 30 arrive at the destination, mobile drive unit 20 may additionally rotate inventory holder 30 to present a particular face of inventory holder 30 to a packer or otherwise maneuver inventory holder 30 to allow access to inventory items 40 stored by inventory holder 30. Mobile drive unit 20 may then undock from inventory holder 30, as described below, or move inventory holder to another destination. For example, mobile drive unit 20 may move inventory holder 30 to a packing station where a packer can select appropriate inventory items 40 from inventory holder 30. Mobile drive unit 20 may then return inventory holder 30 to its original location or another location appropriate for undocking, such as a new storage location reserved for inventory holder 30.

Figure 11:
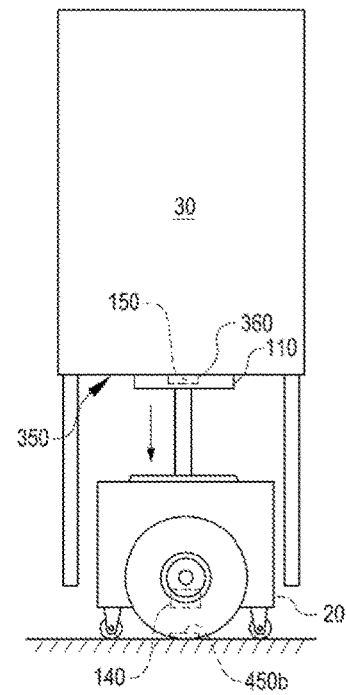

FIG. 11 illustrates mobile drive unit 20 and inventory holder 30 when the two components arrive at an appropriate point for undocking. As noted above, this may represent a final destination specified by the original command, the original storage location for inventory holder 30, or any other point within the workspace. At or near the destination, mobile drive unit 20 may detect another fiducial mark 450, fiducial mark 450B, associated with the undocking location. Mobile drive unit 20 determines its location based on fiducial mark 450B and, as a result, determines that it has reached the undocking location. After determining that it has reached the undocking location, mobile drive unit 20 initiates an appropriate undocking process based on the configuration and characteristics of mobile drive unit 20 and inventory holder 30.

Figure 12:
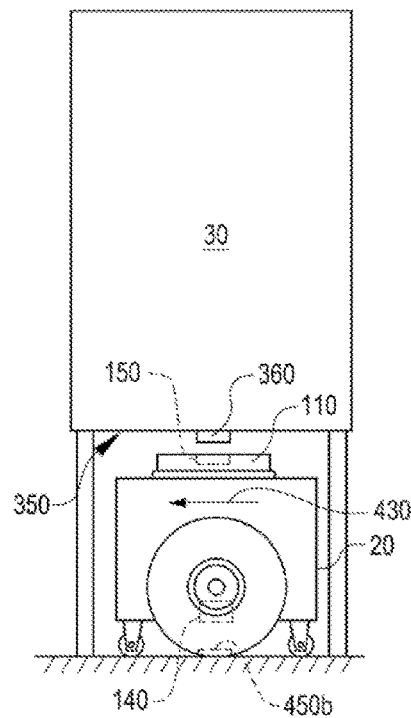

FIG. 12 illustrates a mobile drive unit 20 and inventory holder 30 subsequent to undocking. Mobile drive unit 20 may then move away, as suggested by arrow 430, from inventory holder 30 and begin responding to other commands received by mobile drive unit 20.

As described above, embodiments herein are directed to determining payload properties utilizing actuator parameter data. For example, properties of payloads such as inventory holders 30 may be determined utilizing motor current data measured at motors 502, 504, 506, 508 (FIG. 1) of mobile drive units 20. Such properties may include payload mass, and location in three dimensions of payload center of gravity 530.

Figure 13:
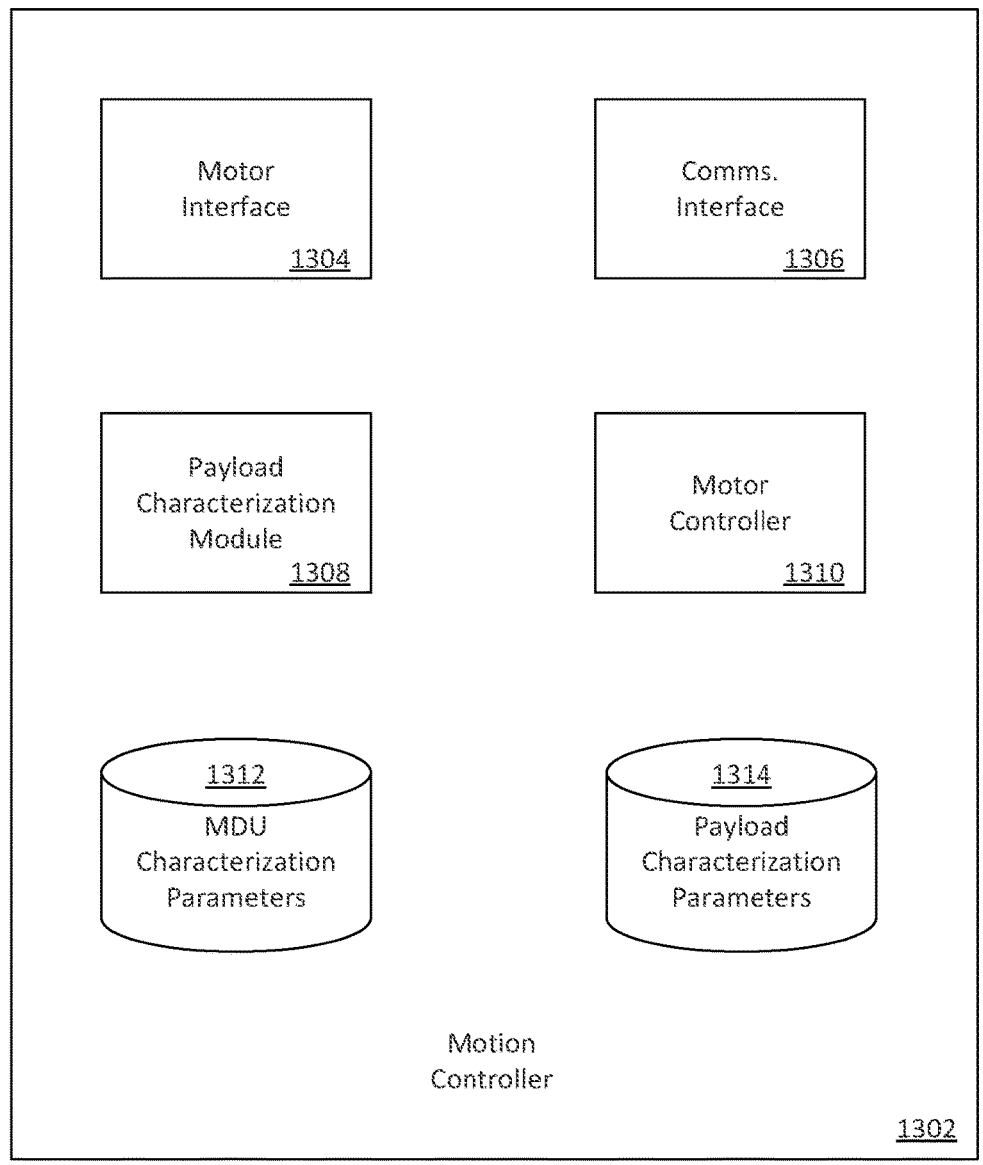
FIG. 13 is a schematic diagram depicting aspects of an example mobile drive unit motion controller in accordance with at least one embodiment.

FIG. 13 depicts an example mobile drive unit motion controller 1302 in accordance with at least one embodiment. The motion controller 1302 is an example of the motion controller 510 (FIG. 1). The motion controller 1302 may include a motor interface 1304 configured to enable modules of the motion controller 1302 such as motor controller 1310 to control motors of the mobile drive unit 518 such as motors 502, 504, 506, 508, as well as to monitor electric currents flowing through the motors. A communications interface 1306 may enable communication between the mobile drive unit 518 and the management module 15 (FIG. 2) and/or other mobile drive units 20. A payload characterization module 1308 may be configured to characterize attributes of the payload 512 including payload mass, and three dimension location of payload center of gravity 530.

In characterizing payload 512 attributes, the payload characterization module 1308 may determine and utilize one or more mobile device unit characterization parameters 1312 and one or more payload characterization parameters 1314.

The mobile device unit characterization parameters 1312 may include electric motor characterization curves such as torque and current curves for individual motors 502, 504, 506, 508, as well as one or more current to mass conversion parameters (e.g., with respect to a calibration payload), one or more payload oscillation frequency to center of gravity height ("frequency to height") conversion parameters (e.g., with respect to a calibration payload), and/or one or more electric motor current to center of gravity axial offset ("current to axial offset") conversion parameters (e.g., with respect to a calibration payload). The payload characterization parameters 1314 may include attributes of a current payload such as payload mass, payload center of gravity height (e.g., above a surface of the mobile drive unit), payload center of gravity half-plane, payload center of gravity quadrant, payload center of gravity location in a portion of a plane perpendicular to an axis of rotation of the payload, and/or payload stiffness. The mobile device unit characterization parameters 1312 and/or payload characterization parameters 1314 may be determined utilizing motor current data from a single mobile device unit. Alternatively, or in addition, the mobile device unit characterization parameters 1312 and/or payload characterization parameters 1314 may be determined based on motor current data from multiple mobile device units, for example, by the management module 15 (FIG. 2). The parameters 1312, 1314 may be modeled (e.g., using a hidden Markov model) and parameter estimates continuously updated based on selected measurements (e.g., with Bayesian techniques) as mobile drive units 20 transport payloads as part of their ordinarily assigned activities.

Figure 14:
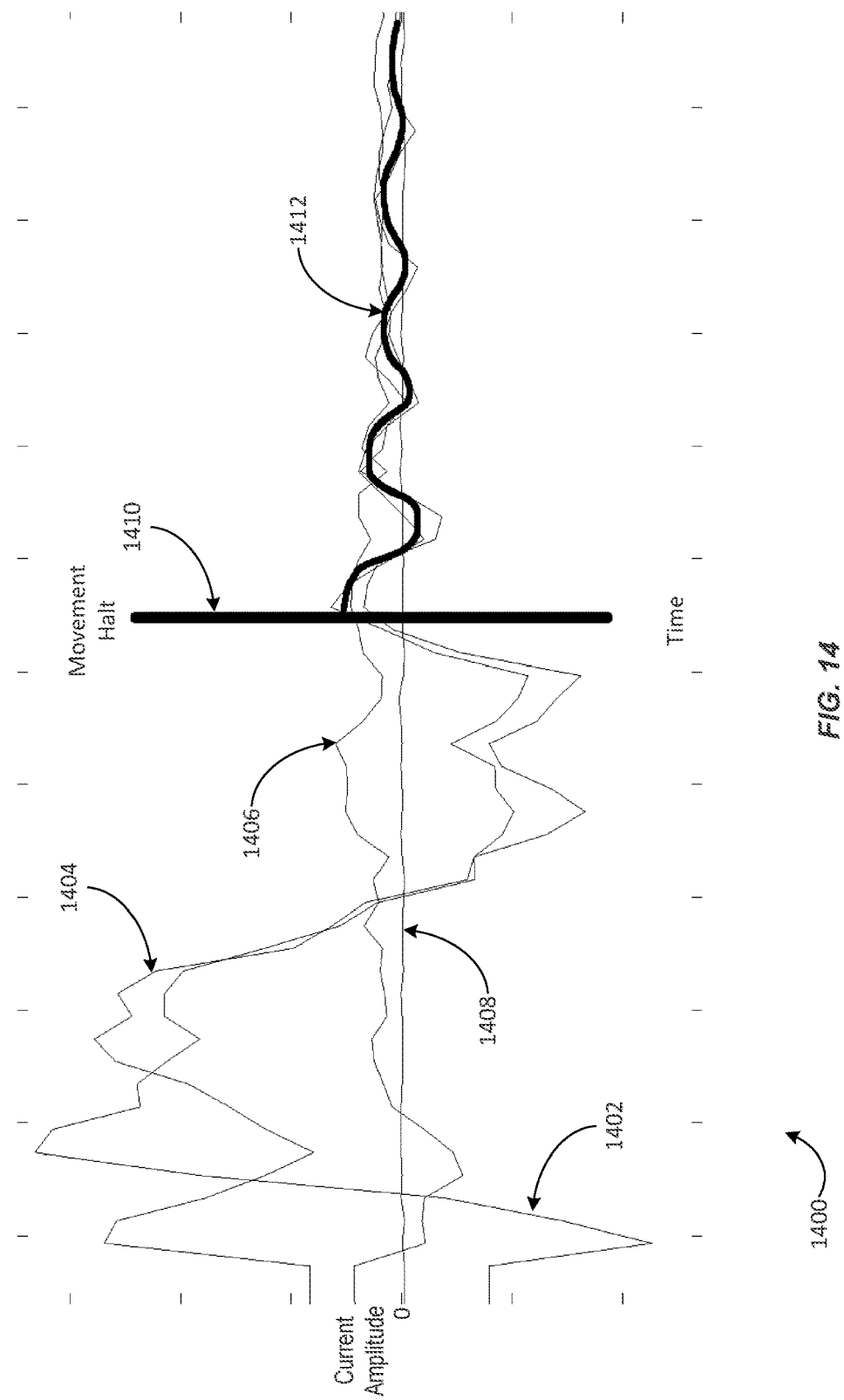
FIG. 14 is a graph illustrating example motor current data in accordance with at least one embodiment.

A hidden Markov model (HMM) can be used to build probability distributions over sequences of observations. The model may be initialized with an initial probability distribution of the sequence of states. For example, the state may be a function of a number of parameters, such as the active command (e.g. acceleration or coasting), the mass of the payload, payload center of gravity, location, and so on. An observation could be motor current at time t. The HMM then makes two assumptions to predict future states: (i) that the probability of being in a state at time t depends only on the prior state (t−1), and (ii) the conditional distribution over the next state given the current state does not change over time. The model may be configured to find (and/or optimize) parameters that maximize a likelihood of a particular sequence of observations (e.g., motor currents) using Bayesian techniques. For example, the HMM may enable the drive to learn and improve various parameters of the system that best satisfy (e.g., are constrained by) the sequence of motor currents observed. These parameters may be constantly updating throughout normal movements of the mobile drive unit. For example, center of gravity height may be estimated during normal movements, and not just after the mobile drive unit has come to a halt and its motor drive current(s) is(are) exhibiting explicit oscillation behavior, FIG. 14 is a graph 1400 illustrating example current motor data in accordance with at least one embodiment. Graph 1400 illustrates current amplitude for four motors 502, 504, 506, 508 (FIG. 1) of the mobile device unit 518 transporting payload 512 for a time unit the motion controller 510 brings the mobile device unit to a halt (at time 1410). Current amplitudes 1402 and 1404 are illustrative of electric currents of motors 502, 504. Current amplitudes 1406 and 1408 are illustrative of electric currents of motors 508 and 506, respectively. Following the halt 1410, a frequency of oscillation can be determined from the current amplitudes 1402, 1404, 1406, and/or 1408, for example from a statistical combination of current amplitudes 1402, 1404, 1406, and/or 1408. Note that in this example, current amplitudes 1402 and 1404 provide adequate signal for detecting the frequency of the oscillation, so that each current amplitude 1402, 1404, 1406, and/or 1408 need not be required to determine the frequency.

FIG. 15A and FIG. 15B illustrate restoring moments utilizable to determine payload center of gravity location in accordance with at least one embodiment. In FIG. 15A a linear motion of the laden mobile drive (an acceleration) in a first direction requires a restoring moment about an axis (located at the intersection of the two dashed lines 1506, 1508) in the direction indicated by the curved arrow (anti-clockwise) to resist angular rotation of the payload. Because the center of gravity 1504 of the payload 1502 is offset from the axis, this restoring moment occurs in accordance with the classical equations of motion and indicates that the center of gravity 1504 lies in the shaded half-plane. In FIG. 15B, a linear motion of the laden mobile drive (an acceleration) in a second direction requires a restoring moment about the axis in the direction indicated by the curved arrow (clockwise) to resist angular rotation of the payload. This restoring moment in response to the new motion indicates that the center of gravity 1504 is located in an intersection of the lower half-plane and the right half-plane, that is, in the shaded quadrant. In conjunction with the knowledge of payload mass, the magnitude of the restoring moment in the turn motor 508 (FIG. 1), can be utilized to determine a distance 1510, 1512 between the center of gravity 1504 and the axis of rotation. For example, the distance may be a linear transformation of the magnitude having suitably calibrated parameters. The distance 1510 may be determined responsive to the motion in the first direction, and the distance 1512 may be determined responsive to the motion in the second direction. When the first and second directions are orthogonal (as depicted in FIG. 15A and FIG. 15B), the distances 1510, 1512 correspond to Cartesian coordinates of the center of gravity 1504 in a plane perpendicular to the axis and having the axis at the origin.

Figure 16:
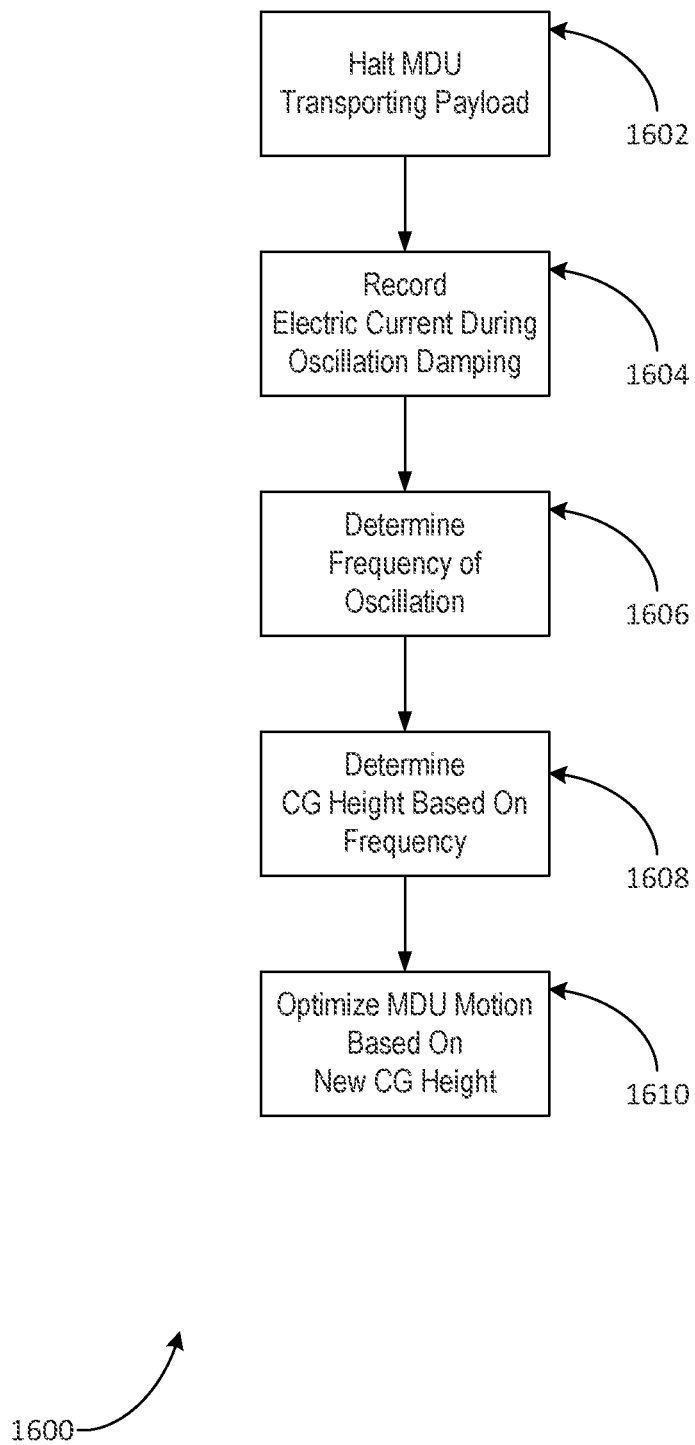
FIG. 16 is a flow diagram depicting example operations for determining a payload characteristic from motor current data in accordance with at least one embodiment.

FIG. 16 depicts example operations for determining a payload characteristic from motor current data in accordance with at least one embodiment. Some or all of the process 1600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 1602, a mobile drive unit 518 (FIG. 1) transporting a payload 512 may halt after motion (e.g., may deceleration to a stop), for example, responsive to signals and/or instructions from the motion controller 510. Responsive to the halt, the payload 512 may begin oscillations dampened by the motion controller 510. At 1604, one or more electric currents of one or more electric motors may be recorded, e.g., by the payload characterization module 1308 (FIG. 13). At 1606, a frequency of the oscillation may be determined, e.g., by the payload characterization module 1308. At 1608, a center of gravity height 532 may be determined, e.g., by the payload characterization module 1308. At 1610, mobile device unit 518 motion may be optimized utilizing the determined center of gravity height 532, for example, the motion controller 510 may utilize the updated center of gravity height to calculate a new lower maximum safe acceleration and/or deceleration of the mobile drive unit 518.

Figure 17:
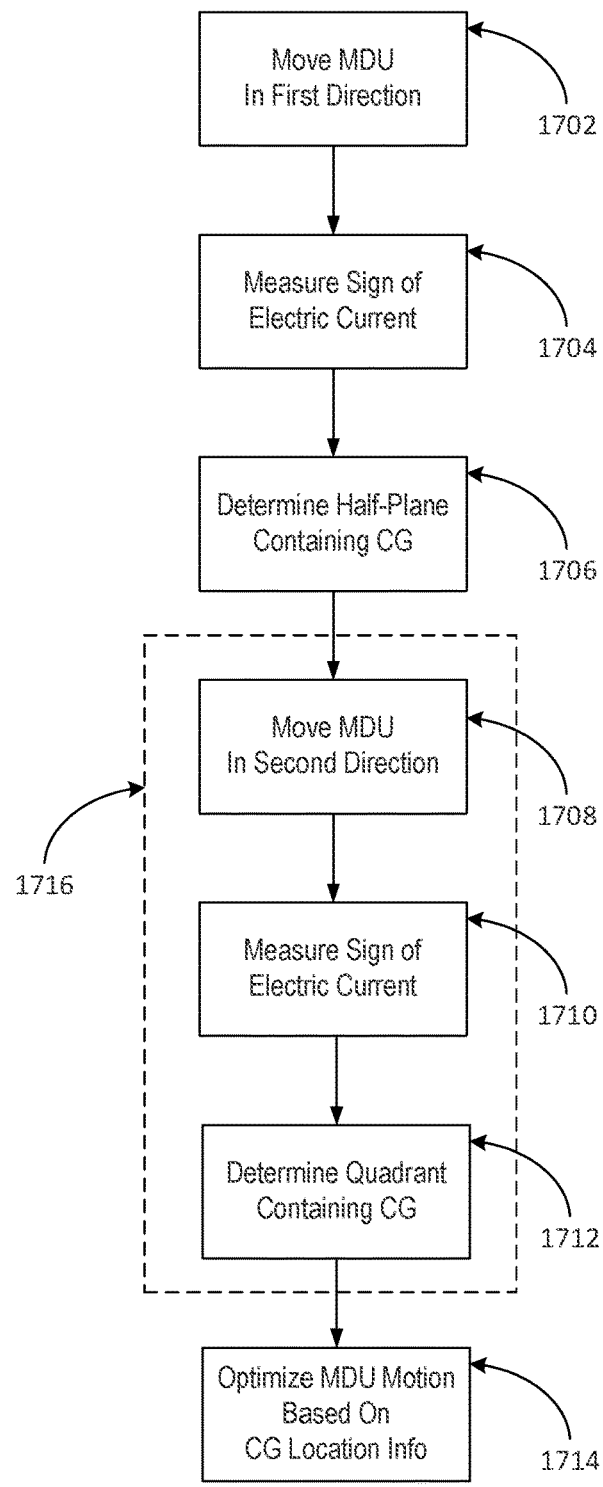
FIG. 17 is a flow diagram depicting further example operations for determining a payload characteristic from motor current data in accordance with at least one embodiment.

FIG. 17 depicts example operations for determining a payload characteristic from motor current data in accordance with at least one embodiment. At 1702, the mobile drive unit 518 (FIG. 1) may move in a first direction. At 1704, a sign of an electric motor may be determined, for example, the payload characterization module 1308 may determine a sign of the electric current flowing through the turn motor 508 utilizing the motor interface 1304 (FIG. 13). At 1706, a half-plane containing the payload center of gravity 530 may be determined, for example, by the payload characterization module 1308 as described above with reference to FIG. 15A. Similarly, at 1708, the mobile drive unit 518 may move in a second direction. At 1710, the sign of the electric current may be measured. At 1712, a quadrant containing the payload center of gravity 530 may be determined. At 1714, mobile device unit 518 motion may be optimized utilizing the determined center of gravity location information, for example, the information obtained at 1706 and/or 1712. Dashed box 1716 indicates that while additional information can be obtained utilizing additional movements, the additional movements are not necessary to benefit from the information provided by a single movement.

Figure 18:
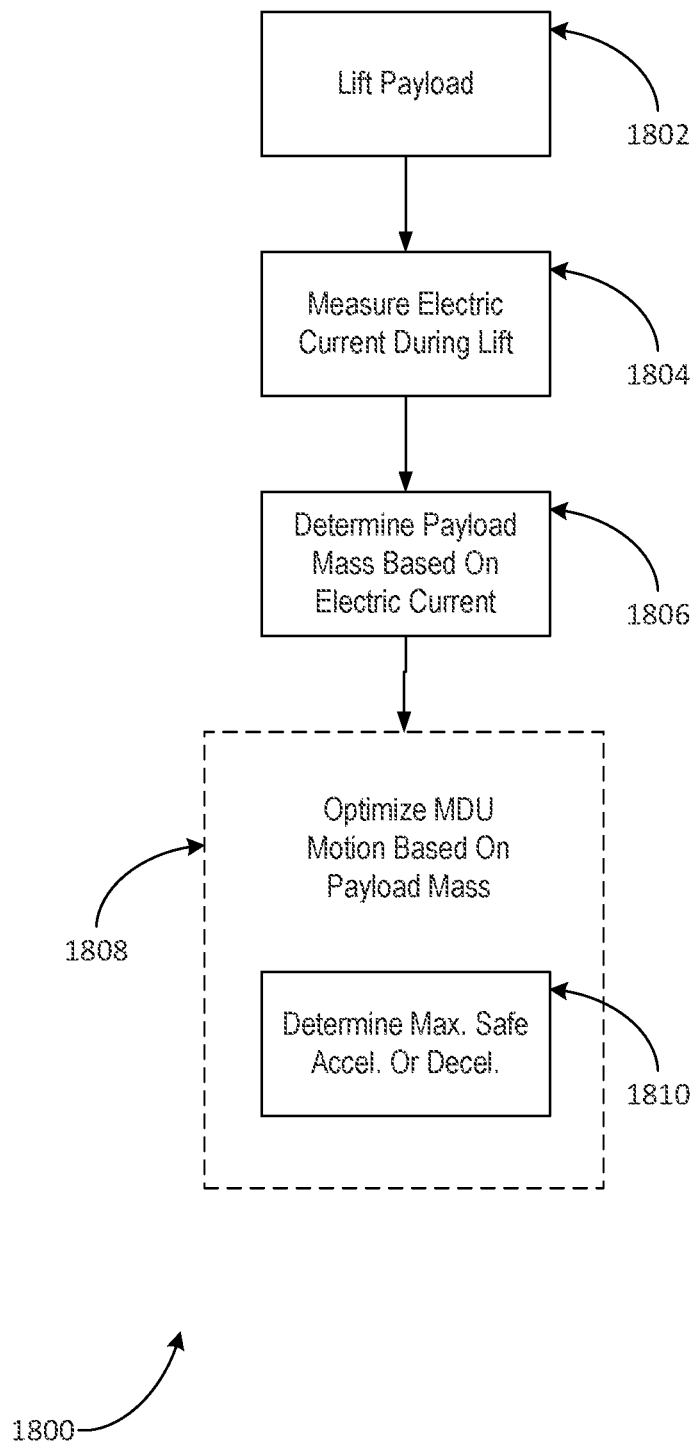
FIG. 18 is a flow diagram depicting still example operations for determining a payload characteristic from motor current data in accordance with at least one embodiment.

FIG. 18 depicts example operations for determining a payload characteristic from motor current data in accordance with at least one embodiment. At 1802, the payload 512 (FIG. 1) may be moved vertically, for example, the motion controller 510 may signal the lift motor 506 to vertically move the payload 512. At 1804, a magnitude of an electric current flowing in an electric motor such as the lift motor 506 may be measured, e.g., by the payload characterization module 1308 (FIG. 13). At 1806, a mass of the payload 512 may be determined based on the measured current, for example, the mass may be a linear transformation of the magnitude having suitably calibrated parameters. At 1808, mobile device unit 518 motion may be optimized utilizing the determined payload mass, for example, the motion controller 510 may utilize the updated payload mass to calculate a new lower maximum safe acceleration and/or deceleration of the mobile drive unit 518 at 1810.

Figure 19:
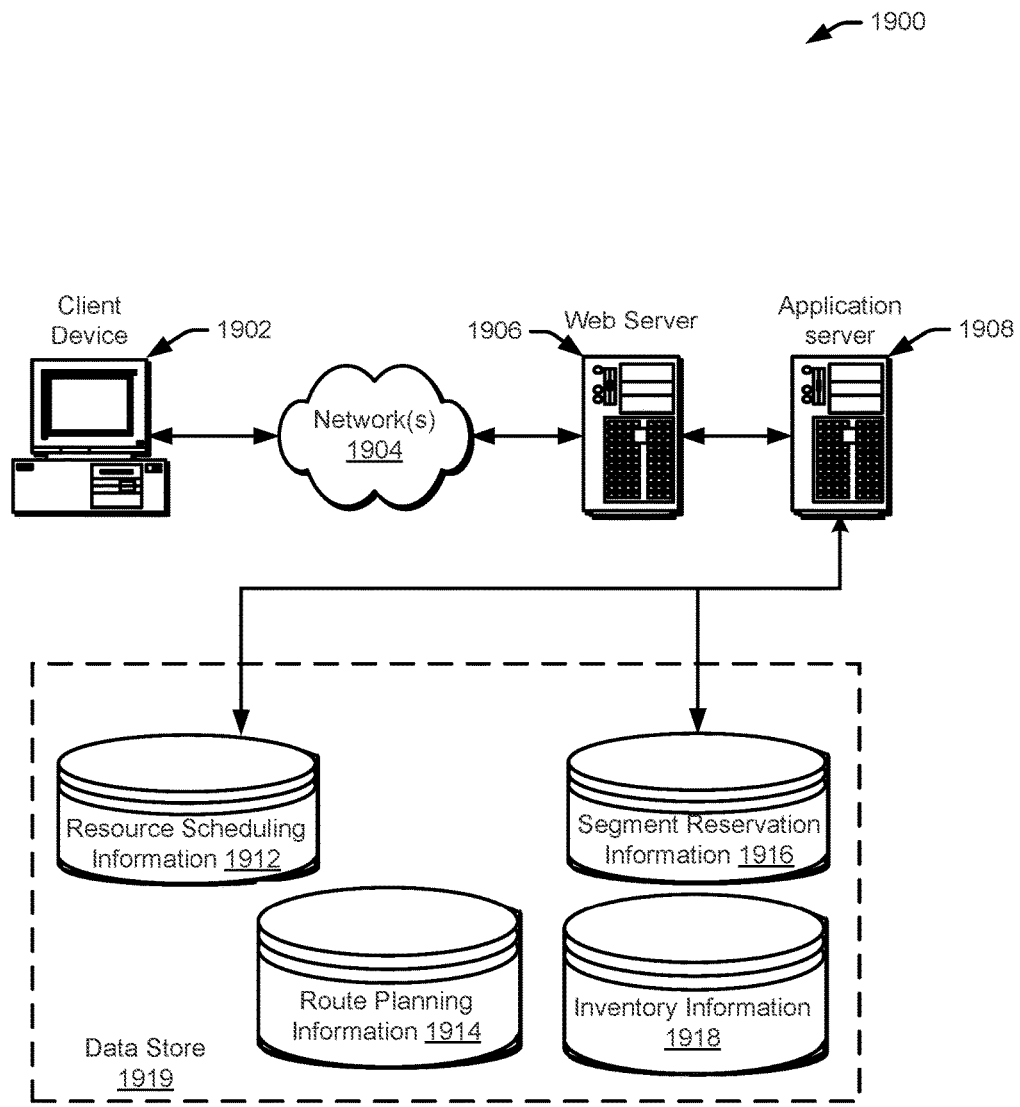
FIG. 19 illustrates an environment in which various embodiments can be implemented.

FIG. 19 illustrates aspects of an example environment 1900 for implementing aspects in accordance with various embodiments. As will be appreciated, although a Web-based environment is used for purposes of explanation, different environments may be used, as appropriate, to implement various embodiments. The environment includes an electronic client device 1902, which can include any appropriate device operable to send and receive requests, messages, or information over an appropriate network 1904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1906 for receiving requests and serving content in response thereto, although for other networks an alternative device serving a similar purpose could be used as would be apparent to one of ordinary skill in the art.

The illustrative environment includes at least one application server 1908 and a data store 1919. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language 25 in this example. The handling of all requests and responses, as well as the delivery of content between the client device 1902 and the application server 1908, can be handled by the Web server. It should be understood that the Web and application servers are not required and are merely example components, as structured code discussed herein can be executed on any appropriate device or host machine as discussed elsewhere herein.

The data store 1919 can include several separate data tables, databases or other data storage mechanisms and media for storing data relating to a particular aspect. For example, the data store illustrated includes mechanisms for storing information which can be used by modules described herein, such as resource scheduling information 1912, route planning information 1914, segment reservation information 1916, and/or inventory information 1918. It should be understood that there can be many other aspects that may need to be stored in the data store, such as for page image information and to access right information, which can be stored in any of the above listed mechanisms as appropriate or in additional mechanisms in the data store 1919. The data store 1919 is operable, through logic associated therewith, to receive instructions from the application server 1908 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the system 1900 in FIG. 19 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java*, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   instructing a motion controller of a mobile drive unit to move a payload utilizing an actuator;
   measuring an operational parameter of the actuator during movement of the payload;
   determining a mass of the payload based at least in part on a magnitude of the measurement of the operational parameter, the payload comprises a plurality of items, individual items of the plurality of items having substantially equal mass;
   counting the plurality of items based at least in part on the determined mass of the payload; and
   instructing the motion controller to optimize a motion of the mobile drive unit while transporting the payload based at least in part on the determined mass of the payload.

2. The computer-implemented method of claim 1, further comprising:
   instructing the motion controller of the mobile drive unit to move a calibration payload utilizing the actuator, the calibration payload having predetermined mass properties;
   measuring the operational parameter of the actuator during the movement of the calibration payload; and
   determining a current to mass conversion parameter based at least in part on the magnitude of the measurement of the operational parameter.

3. The computer-implemented method of claim 2, wherein the current to mass conversion parameter is further based at least in part on a plurality of measurements made by a plurality of mobile drive units moving the calibration payload.

4. The computer-implemented method of claim 1, wherein the mobile drive unit is configured to couple with the payload utilizing a docking head, the docking head is coupled with a lifting mechanism, and the method further includes moving the payload at least in part by causing the lifting mechanism to vertically move the docking head.

5. The computer-implemented method of claim 1, further comprising determining a maximum safe acceleration or deceleration in accordance with a safety policy based at least in part on the determined mass of the payload.

6. The computer-implemented method of claim 1, further comprising determining a maximum safe velocity in accordance with a safety policy based at least in part on the determined mass of the payload.

7. The computer-implemented method of claim 1, wherein measuring the operational parameter of the actuator comprises measuring current going through a motor.

8. The computer-implemented method of claim 1, wherein measuring the operational parameter of the actuator comprises measuring current going through a motor during acceleration.

9. A computer-implemented method, comprising:
   instructing a motion controller of a mobile drive unit to move a payload utilizing an actuator;
   measuring an operational parameter of the actuator during movement of the payload;
   determining a mass of the payload based at least in part on a magnitude of the measurement of the operational parameter, the payload comprises a plurality of items resulting from a sequence of payload modification operations, the sequence of payload modification operations including an item stowing operation or an item picking operation;
   determining a mass of an item of the plurality of items based at least in part on a change in the determined mass of the payload between two payload modification operations of the sequence of payload modification operations; and
   instructing the motion controller to optimize a motion of the mobile drive unit while transporting the payload based at least in part on the determined mass of the payload.

10. The computer-implemented method of claim 9, further comprising:
    instructing the motion controller of the mobile drive unit to move a calibration payload utilizing the actuator, the calibration payload having predetermined mass properties;
    measuring the operational parameter of the actuator during the movement of the calibration payload; and
    determining a current to mass conversion parameter based at least in part on the magnitude of the measurement of the operational parameter.

11. The computer-implemented method of claim 10, wherein the current to mass conversion parameter is further based at least in part on a plurality of measurements made by a plurality of mobile drive units moving the calibration payload.

12. The computer-implemented method of claim 9, wherein the mobile drive unit is configured to couple with the payload utilizing a docking head, the docking head is coupled with a lifting mechanism, and the method further includes moving the payload at least in part by causing the lifting mechanism to vertically move the docking head.

13. The computer-implemented method of claim 9, further comprising determining a maximum safe acceleration or deceleration in accordance with a safety policy based at least in part on the determined mass of the payload.

14. The computer-implemented method of claim 9, further comprising determining a maximum safe velocity in accordance with a safety policy based at least in part on the determined mass of the payload.

15. The computer-implemented method of claim 9, wherein measuring the operational parameter of the actuator comprises measuring current going through a motor.

16. The computer-implemented method of claim 9, wherein measuring the operational parameter of the actuator comprises measuring current going through a motor during acceleration.

* * * * *